Feb. 4, 1958 B. A. SWANSON 2,821,962
ENGINES
Filed Nov. 6, 1953 6 Sheets-Sheet 1
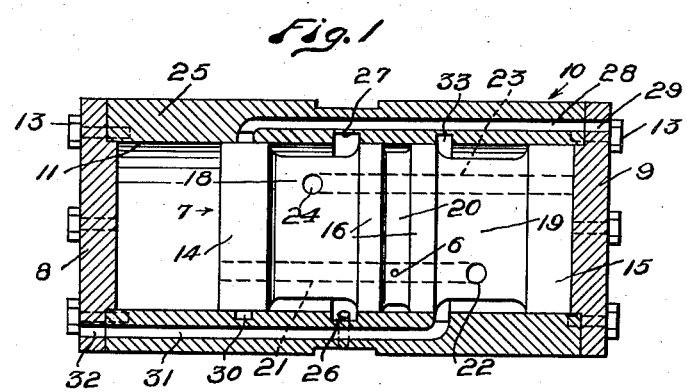
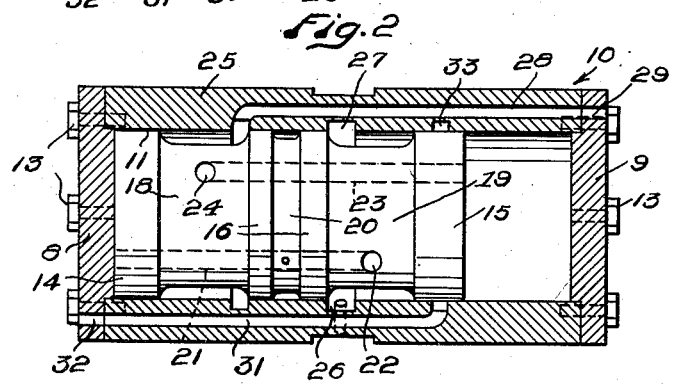
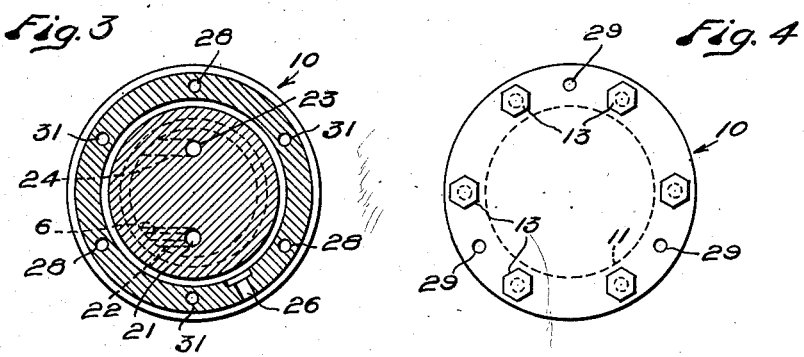
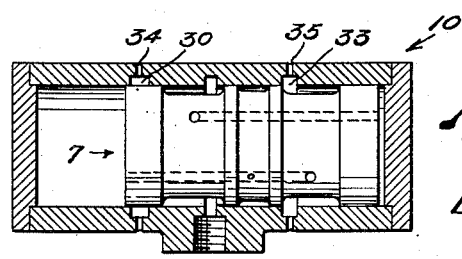
INVENTOR
Bernard A. Swanson.
BY
ATTORNEY

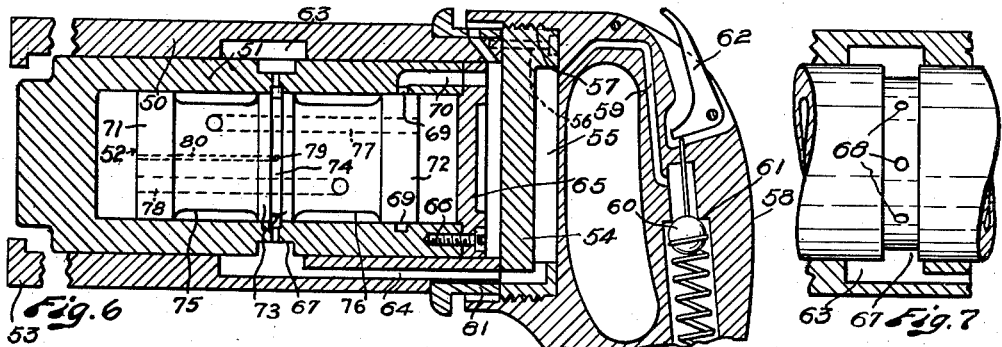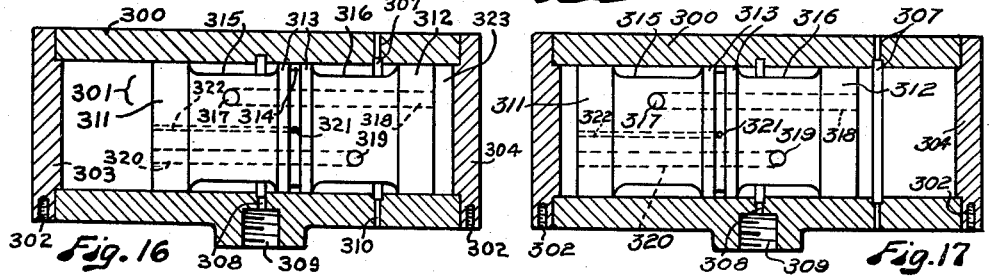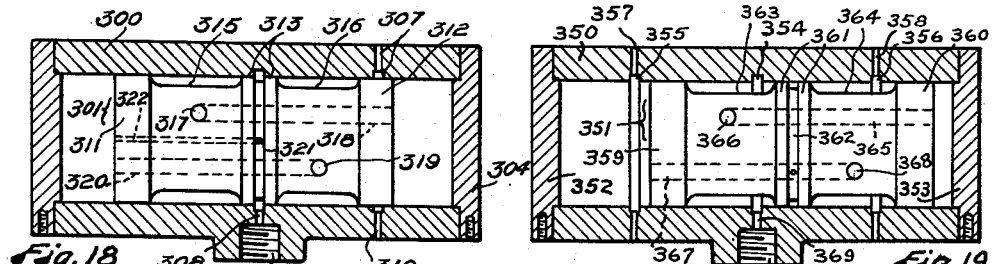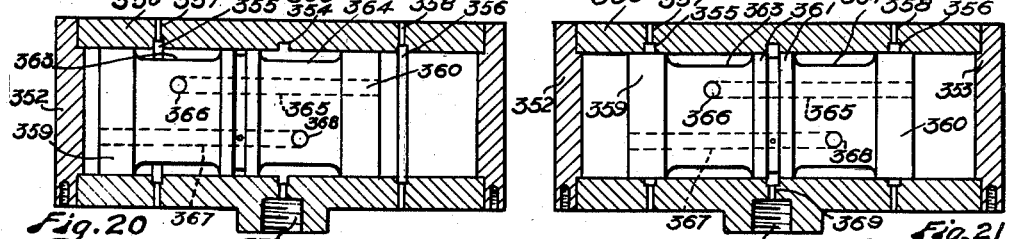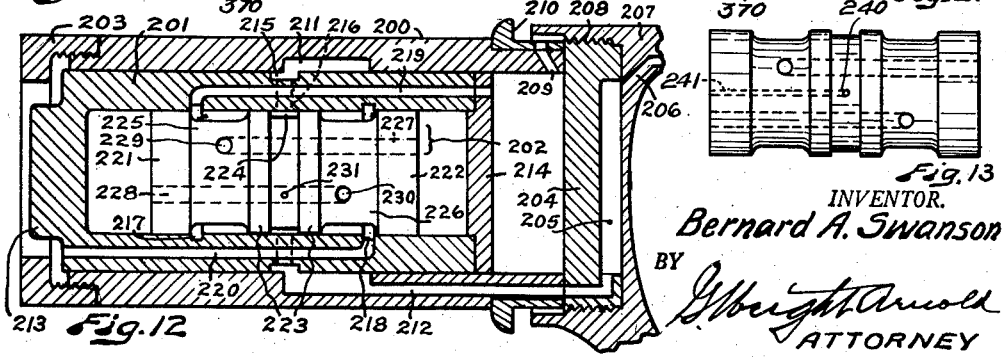

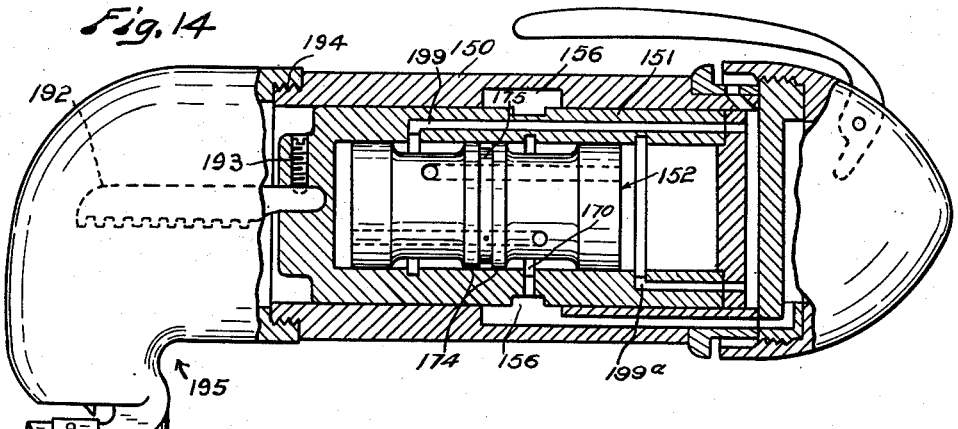
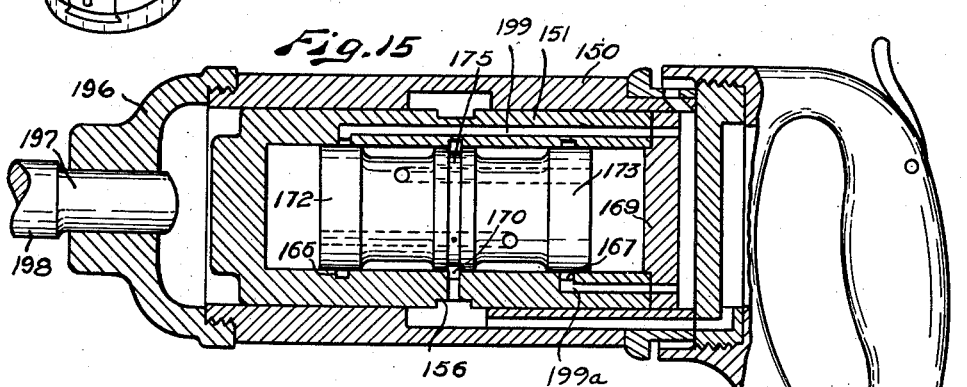
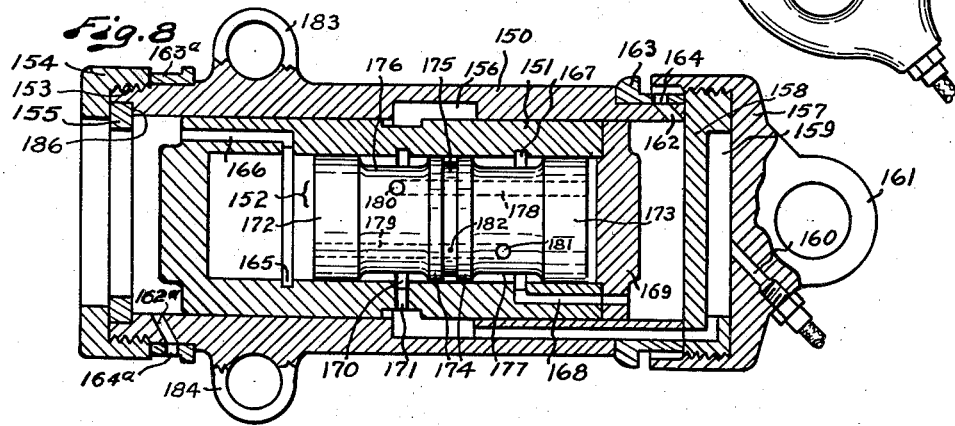
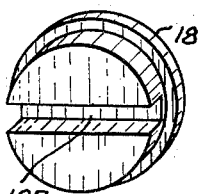
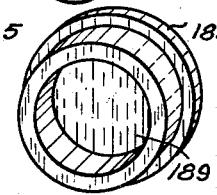
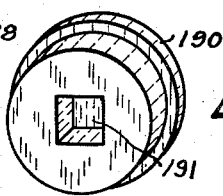
INVENTOR.
Bernard A. Swanson
ATTORNEY Feb. 4, 1958   B. A. SWANSON   2,821,962
ENGINES
Filed Nov. 6, 1953   6 Sheets-Sheet 4

INVENTOR.
Bernard A. Swanson
BY
ATTORNEY

Feb. 4, 1958 B. A. SWANSON 2,821,962
ENGINES
Filed Nov. 6, 1953 6 Sheets-Sheet 5

INVENTOR
Bernard A. Swanson.
BY
ATTORNEY

Feb. 4, 1958 B. A. SWANSON 2,821,962
ENGINES
Filed Nov. 6, 1953 6 Sheets-Sheet 6
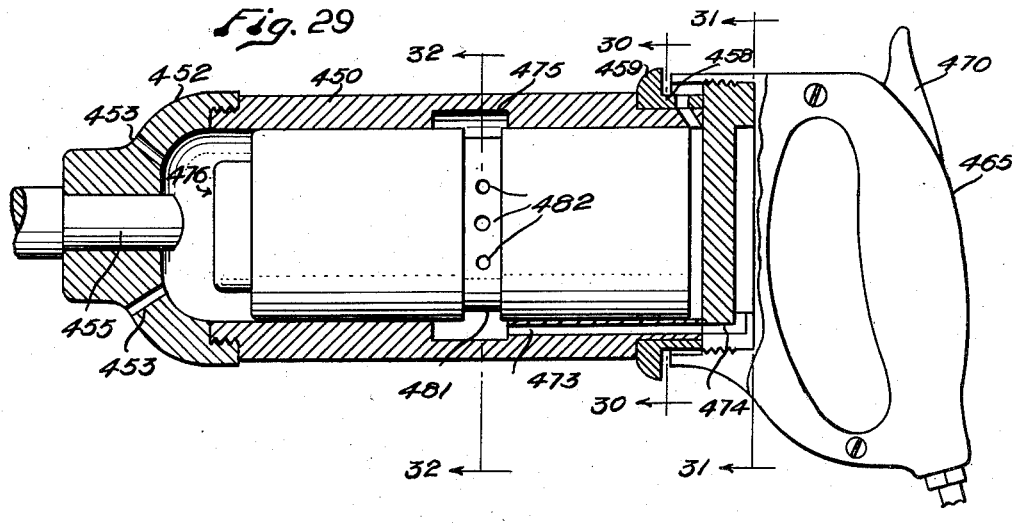
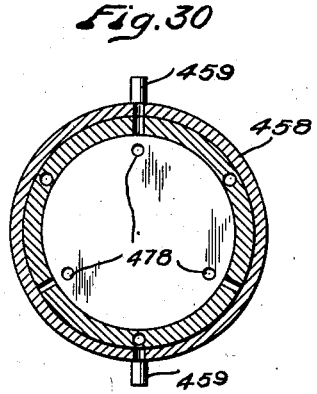
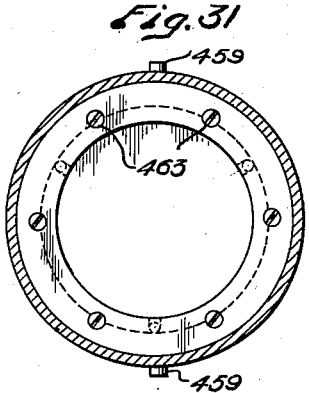
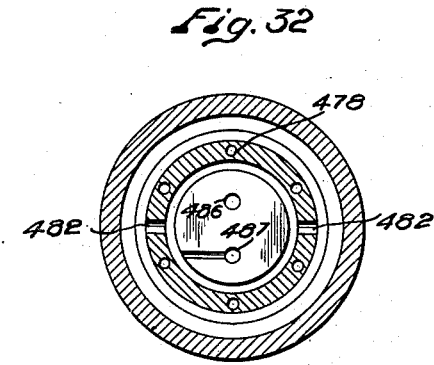
INVENTOR
*Bernard A. Swanson*
BY
ATTORNEY

2,821,962
ENGINES

Bernard A. Swanson, Sacramento, Calif.

Application November 6, 1953, Serial No. 390,617

19 Claims. (Cl. 121—15)

This invention relates to reciprocatory engines.

More particularly my invention relates to an engine adapted to be operated by a compressed fluid as air, steam, or other motive fluid under pressure. Further, more particularly the invention relates to a greatly improved single form of pneumatic engine, and also the invention relates to a double form of pneumatic engine, the latter being the first disclosure, so far as known, of such double engine.

Pneumatic tools as heretofore manufactured, and commonly in use have been objectionable in that they are inefficient in operation, and require extensive maintenance costs.

Furthermore, such prior devices have been seriously objectionable in conveying the shock of the blow due to the reciprocation of the piston directly to the hand of the operator, i. e. the hand of the operator absorbs the reaction or recoil of the blow.

The pneumatic tools in common use are characterized by having excessive weight in the attempt to absorb part of the severe recoil action as well as for other purposes.

A primary and fundamental object of my invention and discovery is to provide a new pneumatic engine characterized by a new relationship of porting, i. e. a new relationship of the inlet port to the exhaust ports whereby new functional relationships are established between the elements of the invention, and the efficiency (including character of work and time element) is increased a plurality of times, and whereby the weight is reduced a plurality of times, and maintenance reduced many times less than devices as heretofore made and designed to do comparable work, and at the same time, the manually operated embodiment of my invention induces far less fatigue on the part of the operators.

A further primary and fundamental object of my invention and discovery is to provide a pneumatic engine characterized by its ability to perform work which cannot be done by presently commonly used devices and one which operates in a manner which prolongs the keenness of the cutting edge of a cutting tool a plurality of times longer than devices of common practice type designed for comparable work.

Also it is a primary and fundamental object of my invention and discovery to provide a starting means which overcomes difficulties due to starting and due to piston stopping on dead center.

The object of the invention herein is to provide an engine activated by compressed air or the like and which is especially useful in operating pneumatic tools such as: pneumatic hammer, pneumatic vibrating means and pile driver and pull mechanism. In the form of the vibratory mechanism it is particularly adapted to use in connection with a standing tool and as a vibratory means in connection with foundry sand molds or in any situation where it is desirable to apply a vibrating force or action. Likewise, such vibratory mechanism is useful where it is desired to separate or move material. To summarize the uses of the invention, the same may be used as follows:

(a) as vibrators for flour or powder and sifting materials—the device being applicable to bin or conveyor;

(b) as separators for sand and gravel, or like mixtures;

(c) in all forms of concrete construction where vibrators are required for example in settling and tamping;

(d) in reciporcatory equipment as in sickles and cutters for harvesters, sanders, rubbers, scraping polishers, and shears;

(e) fruit or nut tree shakers;

(f) in applications where a hammering, chiseling, riveting, chipping or scaling action is involved; and tree pruners; and (g) for uses in pile driving and extractions and construction of cribbing.

These are a few of the uses to which the invention may be applied. In short, it relates to uses where mechanical reciprocation and vibratory movement is involved in all its varied types and character of employment.

These various uses involve different types of reciprocatory movement for the best results—some require uniform and some require unbalanced reciprocatory or vibration action, and it is an object of my invention to provide for the same.

Be it noted that throughout this application, where examples are cited, the same are by way of illustration and not limitation.

Moreover, not only are such prior art tools inefficient as respects the work performed thereby, but also they are inefficient in that they require a large volume of compressed air. In short, they do not economically employ the fluid pressure by which they operate.

A primary and fundamental object of my invention is to provide two forms of the invention herein set forth. One of such forms is herein referred to as the single engine often used in a vibrating engine; and the second one is a double engine, which so far as is known to applicant, is entirely novel and respecting which there is no similar device on the market.

Another object of the invention is to provide an engine which embodies in the double form a reciprocatory piston activated by fluid pressure which may be emitted or exhausted alternately into a chamber portion of a cylinder in turn exhausting said fluid into a cylindrical body or housing in which the cylinder reciprocates, whereby the piston in the cylinder can be operated under varying fluid pressure in order to control the speed of the piston and in which the exhaust fluid medium from the cylinder is utilizied to control the position of said slidable or reciprocatory cylinder when desired, as when the length of stroke of the blow of the cylinder is to be controlled or the frequency of the blows is to be varied.

A further object of the invention is to provide a ruggedly constructed hammer operated by compressed air or other motive fluid, whereby the speed of operation can be readily controlled in order to adapt the tool for various types of work.

A further object of the invention is to provide an engine which exhausts the fluid pressure medium either at each end of the cylinder or in one end portion of the cylinder, whereby in the latter case any moisture present from the air compressor may be led away from the engine and conveyed to the outside of the building so that the operation of the engine of my invention does not add moisture to the air of the room in which it is operating. This is particularly important in the manufacture of explosive powder, flour, or the like.

A further object of the invention is to provide an engine wherein the length of stroke of the part delivering the blow or cylinder may be controlled both as to its length of stroke and as to its rate of reciprocation.

A further object of the invention is to provide a pneumatic engine which is extremely simple and inexpensive to manufacture.

This application is a continuation-in-part of my application Serial No. 97,661, filed June 7, 1949 for an Engine, and also my application Serial No. 97,664, filed June 7, 1949, for a Pneumatic Hammer, both now abandoned.

The above mentioned general objects of my invention together with others inherent in the same are attained by the mechanism illustrated in the following drawings, the same being merely preferred exemplary forms of embodiment of my invention throughout which drawings like reference numerals indicate like parts:

Figure 1 is a central longitudinal sectional view illustrating the piston in one extreme position in the cylinder;

Fig. 2 is a view similar to Fig. 1, but shows the piston in the other extreme position in the cylinder;

Fig. 3 is a sectional view taken on the line 3—3 of Fig. 2;

Fig. 4 is an end elevational view of the engine shown in Figs. 1 through 3;

Fig. 5 is a central longitudinal sectional view of a modified engine;

Fig. 6 is a view in longitudinal section of a modified form of the invention, namely a double engine having the exhaust at one end of the cylinder and having a starter orifice in the piston, with an independent longitudinal passageway communicating with one end of the piston;

Fig. 7 is a fragmentary view of the cylinder of Fig. 6 in elevation with the incasing housing in longitudinal section, showing the multiple fluid pressure inlet ports;

Figure 22:
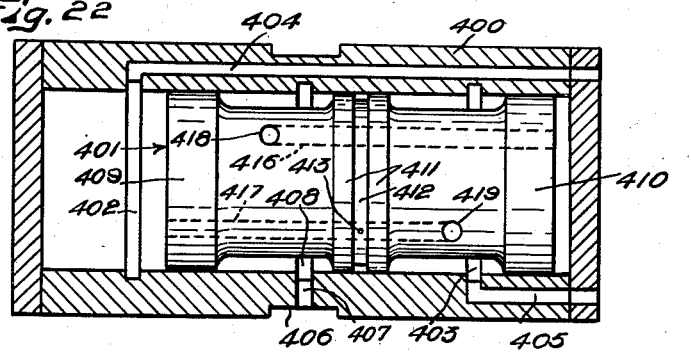
Figure 23:
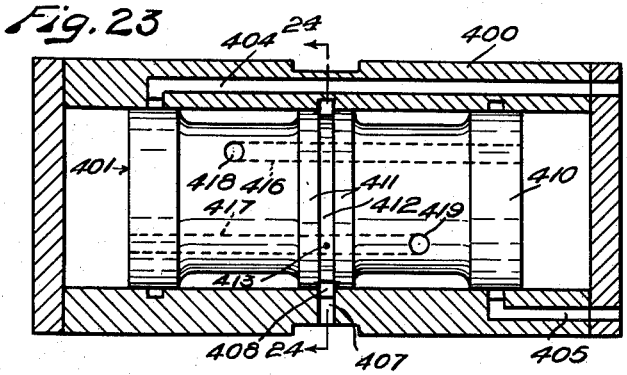
Figure 24:
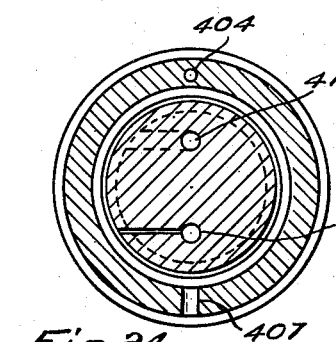
Figure 25:
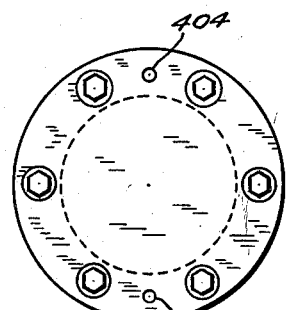
Figure 26:
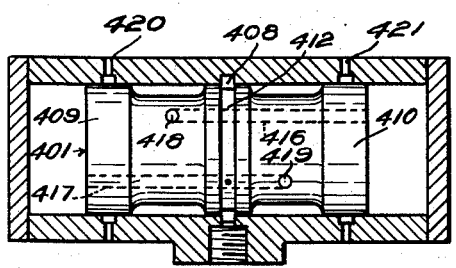
Figure 27:
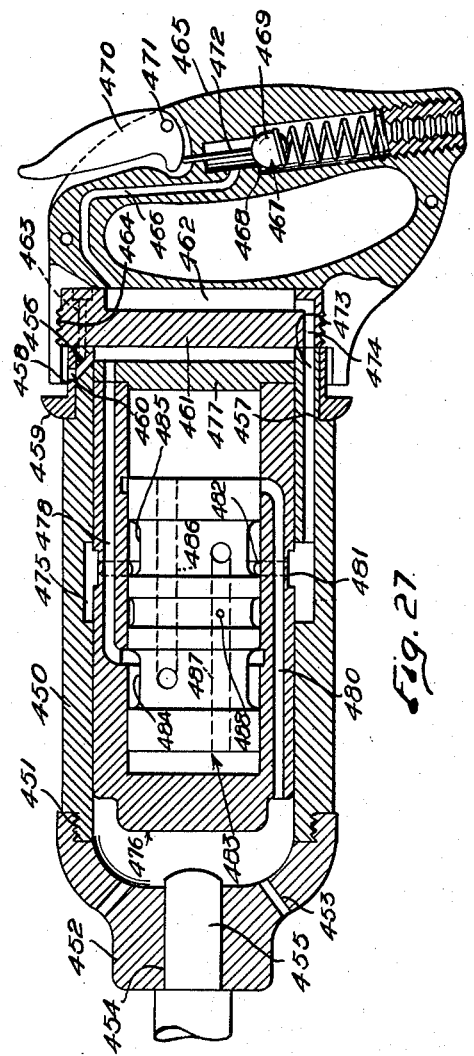
Figure 28:
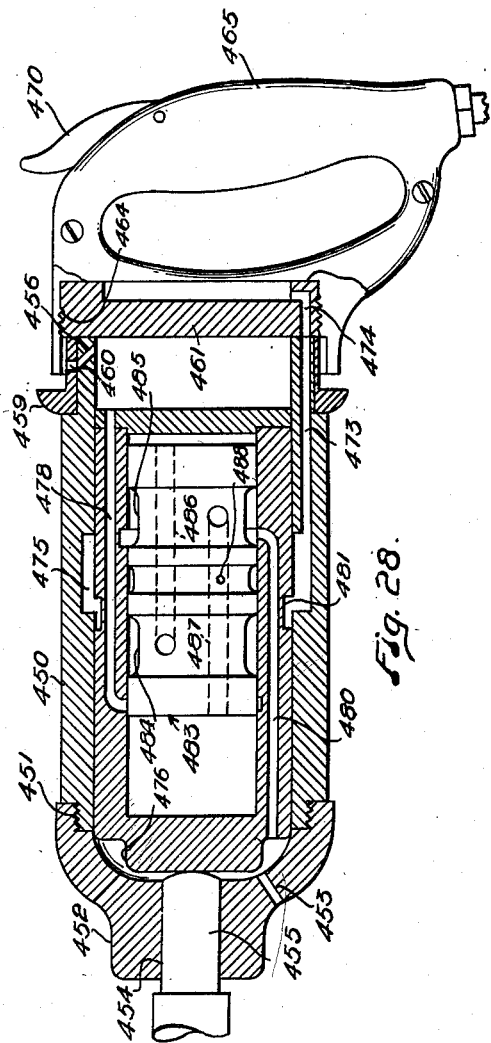

Fig. 8 is a view in longitudinal section of an engine of my invention adapted as a driver or hammer for piles, posts, planks, steel casings, of a form of the double engine of my invention, without end closure of the housing, and having end means for suspending the device in operative position and with porting relationship such that with the piston in either extreme end position, both exhaust ports are open, one to a wide groove of the piston and one to the bore of the cylinder;

Fig. 9 is a view in perspective of a removable adapter closure cap for one end of the form of the invention shown in Fig. 8 for use in driving planks in cribbing construction;

Fig. 10 is a view in perspective of a removable adapter closure cap for one end of the form of the invention shown in Fig. 8 for use in driving piles;

Fig. 11 is a view in perspective of a removable adapter closure cap for one end of the form of the engine of Fig. 8 for use in driving fence posts having a square top;

Fig. 12 is a view in longitudinal section of the double form of the engine having an open end of the housing with a retaining ring for the cylinder and a type of porting in which, when the piston is in dead center, the exhaust ports are in open position with respect to the wide grooves of the piston;

Fig. 13 is a view in perspective of a modified form of the piston of Fig. 12 with the improved starting hole or orifice which has its separate longitudinal passageway leading to one end of the piston;

Fig. 14 is a view partly in longitudinal section of the double engine form of my invention adapted to a shear head, the cylinder being removably secured to a bar of gear rack form, i. e. to a member to be activated;

Fig. 15 is a view in longitudinal section of said invention having a closure cap for the housing or body having an axial opening for the reception of a tool shank, both the exhaust passageways in the cylinder opening into the opposite end of the housing;

Figs. 16, 17 and 18 are views in longitudinal section of the engine of said invention of a modified form in which starter means of improved form has its orifice with a separate passageway leading to the end of the piston independent of the longitudinal passageways leading from the wide grooves to the end of the piston, and the exhaust ports of the cylinder are disposed in one end portion, and the porting relationship is such that the end lug of the piston closes the exhaust port when the starting groove is in register with the inlet ports as in Fig. 18, while in Fig. 16 the piston is in right end position, and while in Fig. 17 the piston is in left hand position, the cylinder bore being of a length to provide fluid pressure cushioning for the piston;

Figs. 19, 20 and 21 are views in longitudinal section of the engine of said invention of a modified form in which the starter means has its orifice and short passageway leading into one of the longitudinal passageways of the piston which opens into one of the relatively wide grooves of the piston, and in which exhaust ports are in each end of the cylinder and the porting relationship is such that the end lugs of the piston close said exhaust ports when the starter groove is in register with the inlet port, as in Fig. 21, Fig. 19 showing the piston in the right hand position in the cylinder and Fig. 20 showing the piston in the left hand position of the cylinder, the cylinder bore being of a length to provide fluid pressure cushioning for the piston;

Figs. 22, 23, 24, 25 and 26 are views similar to views of Figs. 1, 2, 3, 4 and 5 with improved porting relationships and lugging; Fig. 22 showing the piston in the right hand end portion of the bore of the cylinder, Fig. 23 showing the piston on dead center, Fig. 24 showing a transverse view on broken line 24—24, Fig. 25 showing an end view of the cylinder, and Fig. 26 showing a longitudinal sectional view of a modified form of the engine with the exhaust means leading directly through the walls of the piston to the outside; and Figs. 27, 28, 29, 30, 31 and 32 are views of the engine of said invention of the modified form of double engine having porting relationships wherein the exhaust ports open into the relatively wide grooves of the piston when the transverse center or starting groove of the piston is in register with the inlet channel or port, Fig. 27 showing in longitudinal section the pneumatic hammer with the reciprocating cylinder in one extreme position, Fig. 28 showing in longitudinal section the pneumatic hammer with the reciprocating cylinder in the other extreme position, Fig. 29 showing an elevational view of the pneumatic hammer with parts thereof broken away and in section, Fig. 30 being a cross sectional view taken on line 30—30 of Fig. 29, Fig. 31 showing a cross sectional view taken on the line 31—31 of Fig. 29, Fig. 32 showing a cross sectional view taken on line 32—32 of Fig. 29.

Referring in detail to the drawings, Figs. 1–5, the numeral 10 designates an open-ended cylinder which is provided with a bore 11 extending longitudinally therethrough. A pair of end plates 8 and 9 close each end of the cylinder 10 and a plurality of countersunk securing elements, such as headed bolts 13, extend through the plates 8 and 9 and into the cylinder for maintaining the end plates on the cylinder.

A piston is reciprocably arranged in the bore 11 of the cylinder, and in casting or otherwise forming the piston, there is provided transversely-disposed annular lugs or as is known in the trade, "hills," 14 and 15 on each end of the piston. The piston 7 is also provided with an intermediate or middle lug 16 having a shallow starting groove 20. Thus, the lugs 14 and 16 define a first relatively wide annular groove or space 18 therebetween while the lugs 16 and 15 define a second relatively annular groove or space 19 therebetween. In starting groove 20 there is a very small hole or orifice 6.

The orifice 6 communicates or opens into a first open-ended passageway 21 which extends through a portion of the piston 7. The passageway 21 extends from one end of the piston and communicates with or opens into the groove 19, as at 22. Arranged in the piston 7 and spaced from the first passageway 21 is a second open-ended passageway 23 which extends from the opposite end of the piston and communicates with or opens into the groove 18, as at 24.

The wall 25 of the cylinder 10 is provided with an inlet port or opening 26 for the entrance therethrough of fluid under pressure such as compressed air or steam. The entering fluid passes from the opening 26 through an annular cutout or channel 27 and into the interior of the cylinder.

The cylinder 10 is provided with an exhaust means for discharging the fluid alternately from opposite ends of the cylinder, and one exhaust system is shown in Figures 1 to 4, inclusive, there being a different exhaust arrangement shown in Figure 5. Thus, in Figures 1 to 4, the cylinder wall 25 is provided with one or more spaced, parallel and longitudinal exhaust passageways 28 and each of said ways 28 has one end registering with a hole 29 in the end plate 9. The passageways 28 have their other ends opening into an annular transverse recess, cutout, or exhaust annular channel 30, which is formed in the cylinder wall 25. There is also provided one or more spaced, parallel exhaust passageways 31 which extend through the cylinder wall and each of the said ways 31 has one end registering with a hole 32 in the end plate 8. The passageways 31 have their other ends opening into an exhaust annular recess, cutout, or annular channel 33 which is formed in the cylinder wall 25.

Referring to Figure 5, there is shown an engine having the same construction as the engine of Figures 1 to 4, except that the cylinder wall 25 has discharge or exhaust openings 34 which register or communicate with the cutout or exhaust annular channel 30, and there are also exhaust discharge openings 35 which register with the cutout or exhaust annular channel 33.

In operation, fluid under pressure passes through the inlet port 26 into the bore 11 of the cylinder 10. In the event that the piston 7 is at dead center position, the fluid, such as compressed air, enters the orifice 6 in the piston 7 through groove 20 and passes into the passageway 21 and is discharged from the left end of the piston 7, so that the piston will begin to move towards the end plate 9.

In Figure 1, the piston 7 is shown at a right end portion position of the bore of the cylinder 10. At this time fluid will enter through inlet port 26 and will pass through opening 24 into passageway 23; and the fluid is emitted against the end plate 9, so that the piston will move to the left or towards the other end plate 8. As the piston 7 moves toward the end plate 8, fluid already in the end portion of the cylinder 10 having end plate 8 will pass through passageway 21 and will discharge through the exhaust passageways 31. After the piston 7 moves to the other end portion position, Fig. 2, fluid will pass through opening 26, into opening 22, and the fluid will be expelled against the end wall 8 so that the piston 7 will move away from the end wall 8 and toward the other end of the cylinder. During this latter movement, fluid will be discharged through the passageway 23 and will exhaust out through the passageways 28. In the device of Figure 5, fluid exhausts alternately through the exhaust openings 34 and 35 as the piston reciprocates. Thus, the piston 7 will be freely reciprocated or caused to move back and forth in the cylinder 10 and the speed thereof can be controlled and readily varied by varying the pressure of the entering fluid.

The form of cylinder 10 with piston 7, shown in Figs. 1 through 4, is disposable in a housing or body as in Fig. 12 and Fig. 27, thus forming a double engine as described in connection with said figures.

In Figs. 6 and 7 there is illustrated the double form of engine of my invention. In this form there is the housing member 50, enclosing a reciprocatory cylinder 51, in which is a reciprocating piston 52. The housing 50 has, on what may be called the driving end of the device, a cylinder retaining inner annular projection 53 whereby the cylinder 51 is positively retained in the housing. At the end of the housing opposite the driving end is a closing plate 54 which is cut away to define a chamber 55, and this plate is secured to the end of the housing 50 by means of securing elements such as countersunk screws 56. The plate 54 is threaded exteriorly at 57 for the reception of a handle 58 which is threaded on to the plate 54. The handle 58 is provided with a conduit 59 which extends therethrough for conveying compressed air or other motive fluid from a source of supply to the chamber 55. A valve 60 provided with port 61 is arranged in the handle 58 and the incoming air passes through this port. A suitable valve 60 is adapted to selectively prevent or permit the flow of air therethrough. The valve 60 is controlled by an activating member 62.

In the wall of the housing 50, there is provided an annular channel or recess of extended width 63, to provide for inlet air pressure to cover all positions of the cylinder 51 as the latter reciprocates. This channel 63 is connected by passageway 64 with the chamber 55 for receiving inlet air under pressure from the valve 60. The cylinder 51 has its end at the driving end of the device, preferably closed by a solid end integrally formed on said cylinder. The opposite end of the bore of the cylinder is closed by a plate or cap 65, which is preferably held on the end of said cylinder 51 by means of countersunk screws 66. The cylinder 51 is provided with an annular inlet channel 67 which registers with inlet channel 63 throughout the reciprocation of the cylinder 51 in housing 50. From inlet channel 63 there is preferably provided a plurality of radially directed passageways 68, leading into the bore of the cylinder 51. In the wall of the cylinder 51, there is provided an exhaust annular channel 69 which communicates through exhaust passageway 70 with the end of the cylinder 51, whereby fluid pressure of the exhaust fluid medium may build up against the end plate 54, thereby causing the cylinder to move towards the driving end of the device.

The piston 52 is provided with relatively wide hills, lands or lugs 71 and 72, one on each end of the piston 52. Intermediate the said lugs 71 and 72, there is the middle lug or hill 73 which has a starting groove 74 which registers with radially disposed inlet passageway 68 when the piston is on dead center, which means hill 72 closes by its middle portion, exhaust annular channel 69. Middle lug 73 is preferably of about the same width as the end lugs 71 and 72 and in this respect it is different than the middle lug shown in Fig. 12. Such narrowing of the middle lug 73 provides for increased speed and shorter stroke.

On each side of the middle lug 73 there are valleys or relatively wide grooves 75 and 76. These grooves extend to the inside walls of lugs 71 and 72 respectively.

In piston 52 there are two longitudinally disposed passageways 77 and 78, each opening at opposite ends of the piston. Also, passageway 77 opens at its other end in groove 75, while passageway 78 opens at its other end in groove 76. Starting groove 74 is provided with a relatively very small hole or orifice 79 which has its own separate passageway 80 extending to the end of the piston so that fluid pressure may be conducted into the corresponding end portion of the bore of the cylinder 51 when the starting groove is in register with the inlet passageway 68. This is an improved starting means and insures starting promptly.

The mode of operation of this form of my invention, the same being of a double motor form, so-called because it has the cylinder 51 reciprocally disposed in the housing 50 and the piston 52 reciprocally mounted in the cylinder 51, is as follows: It will be noted that the housing 50 does not require an end closure on the driving end, it only being necessary to have a retaining means to positively retain the cylinder 51 in the housing. It will also be noted that there is exhaust means only in one end portion of the cylinder 51. This exhaust pressure is controlled by a rotary control valve 81 by regulating said valve so that such a pressure may be created upon the end plate 54 as may be required to move the cylinder 51 towards the driving end of the device. Also, such pressure can be of a magnitude such as may be required to hold the cylinder resiliently against the object upon which work is being done. In this way it is possible to control the length of stroke of the working below, the frequency of stroke, the type of stroke, and the force of stroke. By type of stroke, reference is made to the fact that if the cylinder is not held with considerable pressure against the work, then the stroke may be long and a relatively heavy blow delivered. On the other hand, if the fluid back pressure holds the cylinder 51 hard against the work, then the type of action is more of a vibrating or pushing action.

The mode of operation of the double engine of my invention involves several very unique advantages. In having an annular channel 63 for the inlet fluid pressure provides for having equal pressure on all sides of the cylinder as it reciprocates in the housing. In fact, the cylinder is thereby air floatingly mounted. The same applies to the piston 52 itself. It likewise has the annular channel 67, and there is pressure in this channel and in the opposed groove 74, 75 or 76 that keeps the piston surrounded by an equal pressure on all sides. In connection with the exhaust port 69, the annular channels there provided effect a sudden drop in the pressure. Upon exhausting, the pressure is relieved and collapses suddenly as the annular channel is opened at once without the air following a circuitous route for escape. Applicant has provided a very efficient device, one characterized by its speed and power of blow delivered, having the very wide circumferential grooves 75 and 76 and providing for the cutting down of the pressure in front of the piston head makes it possible for this device of the applicant to deliver a hard blow. Thus, the providing for cutting out of the walls of the cylinder in forming an annular channel which will provide for an even pressure on all sides of the piston throughout the very wide groove provides in fact for a floatingly mounted piston thus cutting down friction contributing greatly to the efficiency of the device. This, in cooperation with the porting relation, is functionally related to the sudden collapse of the pressure to be relieved in the head of the piston and also renders the device efficient in delivering a hard blow.

Moreover, the pressure upon the end of the cylinder may be regulated to press the cylinder toward the driving end and as the cylinder would be thus held by a resilient fluid medium the cylinder is permitted to move back and forth in response to the action of the reciprocating piston within its bore. The length of stroke of the cylinder is thus controlled by the magnitude of the pressure applied to the end plate 65 of the cylinder by the exhaust fluid. The degree of pressure may be such as to render the movement of the cylinder merely of a vibratory character so that the action of the device will take on more of a pushing instrument rather than a blow delivery device.

In short, the double motor has a wide operating range in connection with the length of stroke, the force of the blow, and the frequency of the blow. Moreover, it is evident that the reaction of the cylinder and of the free mounted piston in the cylinder is not against the hand of the operator who is holding the device. The cylinder is free to reciprocate and the piston is free to reciprocate, thereby relieving the hand of the operator of a severe and continuous shock which is incurred in those devices where the reaction force is entirely taken by the hand of the operator. Of course force and reaction are recognized to be ever equal but here, the reaction is not taken up primarily by the hand of the operator. The fluid pressure provides for a resilient medium to absorb part of this reaction force and in fact, the larger portion, and the compression force of the fluid in the end of the cylinder bore when the piston drives back towards the end plate 65 of the cylinder after passing the exhaust outlet 69 operates to start the cylinder on its next stroke to the right. Thus the reaction force builds up a compression of the fluid which is employed in operating the device. This feature of operation cuts down the amount of fluid pressure involved in the operating of the device. In short the amount of compressed fluid required in doing a particular piece of work with this double motor is greatly reduced over that of devices of common practice design.

The mode of operation and construction of my device is such that a cylinder of, for instance, a certain diameter may be operated by a piston of a greatly lessened diameter. In this the area which must be supplied with compressed fluid is thus greatly reduced so that the amount of fluid pressure required to operate the device of the double motor form of my invention may be cut down a great deal and thus provide another means of reducing the volume of fluid pressure required. This provides for economical operation.

The several advantages and features of efficiency and mode of operation set forth above, be it noted, all combine and cooperate in providing a construction for heavy operation such as is involved in pile driving. The heavy blow which must be there given would create a very severe strain on the construction due to the reaction of the reciprocating cylinders. However, with the double form of motor as set forth in my invention, the reduction of the reaction force on the sustaining means (which takes the place of the hand of the operator in the small tools) permits the use of such a double motor for delivering the heavy blows. Moreover, in connection with pile driving it is often necessary for a heavy blow to be avoided, and the pile should be subjected to a continuing pushing force or light blow rather than to receive a heavy blow due to certain conditions of the ground which is being pierced by the pile. Likewise the same advantages apply to a concrete breaker where heavy blows are involved. Likewise it applies to large mine drills.

The form of device as shown in Figs. 6 and 7 has the improved starting means, namely, the orifice (i. e. very small hole) 79 is provided with its own independent passageway 80 through the piston to the end thereof. This insures against any hesitancy in starting. The fluid pressure is conducted directly from the inlet channels and starting groove to the end of the cylinder bore thereby providing for instant actuating of the piston to one end of the bore, i. e. off dead center, so that the grooves 75 may receive the full fluid pressure for full operative force. The providing of the separate and independent passageway 80 prevents any escape of the fluid pressure through the exhaust ports, which may occur when the starter orifice 79 is constructed to communicate with one of the passageways 77 and 78, as it does in Fig. 8 where the porting and lugging of the piston is such as respects the exhaust port of the cylinder as not to have the end lugs close the exhaust ports when the inlet channels of the cylinder register with the starting groove.

In Fig. 8 is illustrated a further modified form of my invention, relating to the double form of engine. In this exemplification of my double engine, a housing 150 has a reciprocating cylinder 151, which in turn has a piston 152. This form of the invention is well adapted for heavy operations such as work of the nature of pile driving and concrete or rock breaking and heavy drilling. The housing 150 has a threaded end portion 153 at the driving end; that is, the end which is applied to the work upon which may be secured a retaining collar 154 may bear and hold against the housing a cylinder retaining washer or ring 155. The housing 150 has centrally located of its length an inlet annular channel 156. The end of the device opposite the driving end will be referred to as the supporting end. It has an end supporting plate 157 which is threaded upon an end plate 158 which closes that end of the housing 150. This end plate 158 has a cut-out portion 159, forming a recess for the reception of fluid pressure through a conduit 160, connected to a suitable source of fluid pressure. Plate 157 has an eye 161 by which the whole mechanism may be suspendedly mounted from a derrick or other means. The adjacent end portion of the housing 150 has a plurality of passageways 162, over which there is a rotary valve member 163 which has ports 164 which may register with said passageways 162 and may regulate the amount of opening for the exhaust passageways by revolving the valve-like ring 163, which are of a preferably V-shape form, the V running circumferentially of the housing, whereby the amount of opening for the passageways 162 may be very precisely regulated. The same valve arrangement is provided at the opposite end in this modified form of the invention. The corresponding parts are given the same numerical number followed by a small "a." The plate 158 is secured to the housing 150 by means of securing screws, more fully shown in Fig. 4.

Cylinder 151 has an exhaust annular channel 165 in the driving end of the piston, and this in turn connects with a longitudinally directed conduit 166, which allows the exhausting air to escape through the driving end of the device. It will be noted that in this form of the device there is no end closure in the driving end. At least, there may not be any such closure. However, as it will appear later, adapters may be inserted to adapt the device for particular operation. In that case, the end would be closed, but as it is shown in Fig. 8, the end involves no closure whatever. The cylinder 151 is retained by the cylinder retaining ring 155 held in place by retaining member 154. At the end opposite the driving end of the cylinder 151, there is likewise a second exhaust annular channel 167, and this has an exhaust longitudinal passageway 168 which exhausts through the end plate 169, which closes the end of the cylinder 151 opposite to the driving end. End plate 169 is held in place by screws as appears in Fig. 4. In the middle or central portion of the cylinder 151, there is an inlet annular channel 170, and there are also inlet passageways 171 leading from the inlet annular channel 156 into said inlet annular channel 170. There are a plurality of such passageways spaced circumferentially. See Fig. 7.

The piston 152 has lugs 172 and 173 respectively located on opposite ends of the piston. Piston 152 also has a middle or centrally disposed lug 174 which has a shallow starter groove 175. Such middle lug 174 is shown as relatively narrow in contrast to the middle lug 16 (Figs. 1 and 2). Such narrowing provides for short stroke and higher speed than is disclosed in Figs. 1 and 2. On each side of the middle lug 174 and the end lugs, there are valleys or grooves 176 and 177 of relatively wide width, thereby providing for the admission of air or the exhausting of air over a considerable portion of travel of the piston. Piston 152 has two longitudinal passageways 178 and 179, 178 having a port opening 180 in valley or groove 176 and leading through the piston 152 to its end, that is, opening to that end of the device referred to herein as the supporting end; that is, the end opposite the driving end. Longitudinal passageway 179 leads from port 181 in groove or valley 177 and leads through the piston to the end of the piston in the driving end of the device. The starter groove 175 has a very small hole or orifice 182, having a passageway leading directly to longitudinally directed passageway 179.

Housing 150 may have eyelets 183 and 184 as securing means for auxiliary equipment such as chains or wire cables when the operation of the mechanism as a whole is desired to drive upwardly; that is, in the direction of the suspending eye 161, as when the engine is to be used as a pile puller or extractor.

In Figs. 9, 10 and 11 are shown auxiliary parts or adapters to be used and secured into the housing of the form of the invention in Fig. 8. As stated above in connection with Fig. 8, the said form of the invention may be used as it is without any closure of the driving end. The cylinder 151 may deliver its blow directly to the object upon which work is to be done. In other words, if a hammer blow is to be delivered, then the cylinder 151 can be driven or vibrated directly against the object to which the blow is to be applied. It shows an unclosed end of the device.

If the device of Fig. 8 is desired to be used as a pile driver, for example, in driving planks for a cribbing to hold back earth, particularly a sandy soil, then the retaining member 154 of the device of Fig. 8 is removed from the housing 150 and likewise the retaining ring 155. Then the adapter device of Fig. 9 would be secured in place on the housing 150. Then shoulder 185 would be secured in the place of ring 155, and then retaining member 154 would be secured in place, holding the shoulder 185 tight against the shoulder 186 of the housing 150. Adapter of Fig. 9 would preferably have a transverse slot 187 to receive therein the upper end portion of a plank which is to be driven as a part of the cribbing to hold back the sand.

Again, if the device of Fig. 8 is to be used as a pile driver in this case likewise the adapter of Fig. 10 would be substituted for the adapter of Fig. 9. Then adapter of Fig. 10 likewise has shoulder 188 which would be held against shoulder 186 of the housing 150 and the retaining member 154 would then bear against the shoulder 188, thereby holding the same securely upon the driving end portion of housing 150. In this instance, the adapter of Fig. 10 would have a circular recess 189 to receive therein the top end portion of a pile which is to be driven. The dimension of this circular recess could obviously be varied to fit different diameters of piles, thereby making it unnecessary, if so desired, to apply the usual iron ring at the top of the pile to prevent its flaring, distorting, or mushrooming the top of the pile.

The adapter shown in Fig. 11 has a shoulder 190 which bears upon the shoulder 186 when the adapter is applied to the housing 150. In this case, the retaining member 154 bears upon the shoulder 190, holding the adapter in place precisely as in the case of adapters shown in Figs. 9 and 10. The adapter of Fig. 11 has a rectangular recess 191 to adapt the same to receive the upper end portion of a post having the top portion of rectangular shape in cross section.

In connection with the mode of operation of the device of Fig. 8, let it be particularly noted that the lugs 172 and 173 of the piston 152 are disposed longitudinally of the piston 152 at such distance from the center groove as to cause these to cover and close the exhaust annular channels 165 and 167 when the starting groove 175 is in direct register with the inlet annular channel 170. This arrangement of the end lugs 172 and 173 with respect to the location of the exhaust annular channels 165 and 167 so that these channels are covered insures positively that the type of starter with the orifice leading directly into the passageways 181 will insure starting of the device, because all exhaust ports are closed when the lugs are thus arranged with respect to the exhaust annular channels 165 and 167.

When adapters of Figs. 9, 10 and 11 are employed with the engine of Fig. 8, the driving end will be closed and exhaust fluid may be confined by operating ring valve 163ª so that the cylinder 151 may be held in the upper position in housing 150 to provide for the reverse action required in extracting or pulling piles or the like.

In Fig. 12, a modified form of the invention of the double engine type is illustrated. In this form, the housing 200 has a reciprocating cylinder 201, and inside of this cylinder a piston 202. The housing 200 may have an open end as illustrated, and the end portion of the housing 200 may have a retaining ring 203, which may be unscrewed, and tool-holding closure end members may be attached thereto for the holding of various tools, the shank of which may receive direct blows from the reciprocating cylinder 201 as illustrated in Figs. 15 and 27 herein. In other words, the form of the device shown in Fig. 12 may be operated with an open end or a closed end so far as the housing is concerned. The housing 200 at its opposite end has an end closure plate 204 held against the end of the housing 200 by means of screws. The plate 204 has a recess or chamber 205 which is supplied with fluid pressure from a conduit 206, which is connected to a controlled source of fluid pressure. The chamber 205 may be closed by a handle member 207 which has internal threads 208 which engage threads upon the plate 204, whereby the handle member 207 may be secured to the plate 204 with an air-tight connection. In the end portion of housing 200 there are passageways 209, and over this end portion of the housing 200 there is secured a ring valve 210 which has V-shaped openings, the said V-shaped openings being directed circumferentially of the housing, whereby very precise or refined degrees of opening of the passageways 209 may be provided for the escape of exhausting fluid pressure between the end of the cylinder 201 and the plate 204.

Housing 200 has an inlet annular channel 211 of considerable width to provide for a continuing admission of fluid pressure through the inlet passageways leading to the piston 202 as will be subsequently described herein, said channel being tranversely located substantially midway of the length of the housing. In the housing wall 200, there is provided an inlet longitudinal passageway 212, connecting inlet annular channel 211 with chamber 205.

The cylinder 201, Fig. 12, may have an integrally formed driving end portion 213 at the driving end and an end plate 214 at the opposite end. Thus is enclosed a bore for the cylinder 201, having a driving end 213 and an end plate end 214. Cylinder 201 is provided with an inlet annular channel 215 which has radially directed passageways 216, which preferably are a plurality in number. These passageways lead into the bore of the cylinder 201. By having the plurality of such passageways and these leading from an annular channel of relatively large proportion, provides for maintaining an equal pressure on the reciprocating piston 202 in the bore of the cylinder; and likewise the full pressure of the fluid pressure is more readily available for quick and speedier operation and reciprocation. Likewise said plurality of passageways 216 eliminates a drag on one side of the piston, which develops when the inlet fluid pressure is admitted on one side only of the piston. In short, it provides equal pressure on all sides.

Cylinder 201 has an exhaust annular channel 217 in the driving end portion and exhaust annular channel 218 in the opposite end. Connecting with these channelways are respectively passageways 219 and 220, each leading to the end of cylinder 201 as illustrated.

The piston 202 is reciprocally mounted within the bore of cylinder 201. This piston has the relatively wide hills, lands or lugs 221 and 222 located on the end portions of said piston. Likewise, it has the lug 223 located in the middle or central portion. This middle lug has a shallow starting groove 224 dividing said middle lug 223 into two halves. Said piston 202 also has relatively wide grooves 225 and 226. Also, said piston 202 has passageways 227 and 228 within the same extending longitudinally therein. One of said passageways 227 extends from port 229 in groove 225 to the end plate end portion of the bore of cylinder 201, while the other passageway 228 extends from port 230 to the driving end of the bore of cylinder 201. The shallow groove 224 has an orifice or very small opening 231 which communicates with passageway leading to the longitudinal passageway 228.

The mode of operation of the device embodying this form of the invention is as follows: Fluid pressure is conveyed from a suitable source of supply to the chamber 205, the amount of fluid pressure medium passing therethrough being controlled by a commonly employed manually operable actuating valve as shown in Fig. 6. The fluid pressure then passes through passageway 212 from whence it passes to inlet annular channel 211; and from thence it passes into inlet annular channel 215, from which it passes through the plurality of passageways 216 in the wall of the cylinder 201.

Thus, with the piston in the position shown in Fig. 12, the starting groove is in register with the inlet passageways 216. The fluid pressure then would pass through starting orifice 231 into passageway 228 and from thence it would pass into the driving end of the bore of the cylinder 201. Building up this pressure will cause the piston 202 to move to the right and thereby off dead center and moves the inlet passageways 216 into register with groove 225. The size of the passageways connecting with groove 225, as well as 226, is of comparable size with the diameter of the inlet passageways (thus in direct contrast with the orifice 231) that the full pressure of the fluid medium passes down through port 229 and into the end plate end of the bore 201 and with great force pushes the piston 202 back to the driving end of the bore, thereby bringing groove 226 into position with the inlet port, where it receives the full pressure of the fluid medium; and the pressure then enters 230 and down through the passageway 228 to the driving end of the bore of the cylinder 201, thus causing the piston to reverse its direction and move to the opposite end of the bore of the cylinder 201. This cycle is repeated then as the piston is maintained in reciprocation. In thus reciprocating, the exhausting of the air from the end portions of the cylinder bore is to be made as follows: As the piston 202 moves to the right, the air in front of the piston would first be exhausted through exhaust channelway 218 and passageway 220. As soon as lug 222 moved across the channelway 218, then such exhaust would bue cut off and the air would exhaust through passageway 227 until the lug 221 closed off the channelway 217. Thus, the passageways 227 and 228 are employed by applicant both for exhaust purposes as well as for inlet fluid pressure purposes. This is particularly true in the device having the porting relationships of Fig. 12; that is where the lugs 221 and 222 do not close the exhaust ports 217 and 218 at the same time when the inlet passageway 216 is in communictation or register with the starter grooves 224. The half lugs on each side of the starter groove 231 of lug 223 are of a width to close the inlet passageways 216 when they are in direct register therewith. The grooves 225 and 226 are of a relative width that permits their engagement with the ports 229 and 230 for a considerable portion of the length of travel of the piston 202. The continuous admission of air to these grooves 225 and 226 is likewise accomplished by reason of the relatively wide width of the inlet annular channel 211.

The rotary valve 210 controls the amount of exhaust fluid pressure which may be caused to bear against end plate 214: and thus the cylinder 201 may be caused to move to the left; that is, to the driving end of the housing 200 and held there resiliently. Upon operation of the piston, the cylinder 201 will be caused to reciprocate within the limits defined by the magnitude of the exhaust fluid pressure maintained against the end plate 214. In this way, the operation of 201 may involve reciprocation which will impart a hammer blow; or it may involve a stroke of such short length that it will be more of a vibratory or pushing action upon which work is being done, whether same be the shank of a tool or the direct blow upon the work between end 213 of the cylinder 201.

It should be noted that the retaining ring 203 may be removed and other end closures screwed upon the housing 200. Such form of closure may be that as shown in Fig. 15 above. Also it should be noted that some of the fluid medium will be trapped and retained in the ends of the bore of the cylinder in its reciprocation. This means that the force of the vibrator will be a cushion blow in actuating the cylinder 201; that is, in giving a secondary movement to the cylinder 201. This mode of operation avoids a metal to metal contact of the piston 202 against the end of the bore of the cylinder 201. Such trapped medium as above referred to will be substantially void of the pressure until the piston moves against the same; thus, its movement will not be unduly hampered and yet the advantage of not having a metal to metal blow will be achieved.

Thus, in a brief summary statement, it is clear that the double motor is one providing a number of important control features for its operation. From the foregoing, it is apparent that a pneumatic hammer or driving means has been provided which compounds the power and eliminates much of the discomforting shock that such a tool inflicts upon operators, usually occurring in devices of common practice designed as heretofore designed. A wide range of speed is possible; and the power delivered and the speed can be controlled either by the fluid pressure admitted or by the exhaust control means; namely, the rotary valve 210.

In Fig. 13, the piston illustrated in Fig. 12 is in part duplicated and is identical in construction, excepting only that there is the improved starting means as follows: the orifice or very small opening 240 of the starting groove 224 has its independent and separate passageway 241 extending through the piston and communicating, that is, opening into the adjacent end of the bore of the cylinder 201. Thus, is assured the prompt starting of the piston.

Be it particularly noted that no live fluid pressure need be admitted to the end of the cylinder 201. The only pressure provided against such end plate is that arising from the exhaust fluid medium, and this in turn may be controlled by the rotary ring valve 210. If desired of course live fluid could be used with a change of exhaust ducts.

In Figs. 14, 15, and 8, the construction of the motor parts or assembly are the same excepting only as to the exhaust passageways. Accordingly, the said parts in Figs. 14 and 15 are given the same numerals as given in Fig. 8. The mode of operation is substantially the same. In Fig. 14 the cylinder 151 is directly connected to a releasable member 192, which in turn may be connected to other mechanism for operation. Said member may be held in place by a set screw 193 which may be supplementary to the screw threads 194. There is specifically shown a schematic application of the double engine to a shear head 195. In Fig. 15, the closure cap 196 is shown screwed upon the end of housing member 150, having an axial opening which receives the shank 197 of a tool 198. Figs. 14 and 15 have exhaust channelways 199 and 199a in the wall of the cylinder 151 extending to the same end of the cylinder (that is, to the end plate 169) end plate end of the cylinder, that is, opposite to the driving end. In Fig. 8, the exhaust passageways extend in opposite directions as already described, one leading to each end of the cylinder. The porting arrangement in the device of Figs. 14, 15, and 8 is identical; that is, the piston is of a length and its relationship to the exhausing annular channels 165 and 167 such as the lugs 172 and 173 close the same when the starting groove 175 is in register with the inlet annular channel 170. In Fig. 14, the position of the piston 152 is shown in the left end portion in the bore of the cylinder 151. In Fig. 15, the piston is shown at what may be termed dead center; that is, with the starting groove 175 in register with the inlet annular channel 170 of the cylinder. In Fig. 8, the position of the piston is shown in the right end portion of the bore of the cylinder 151.

These various positions of the piston show clearly its position with respect to the exhaust and inlet porting. They also show the space in the end of the cylinder bore for the compressed fluid medium which may be entrapped in the end of the bore of the cylinder. Particular attention is called to the fact that the shoulders; that is, the parts of the middle lug 174 on each side of the starting groove 175 are slightly wider than the width of the inlet annular channel 170. This construction positively insures that the piston will not stop in a position near the middle, and there will be no passing of fluid pressure from the inlet annular channel 170 simultaneously to both sides of one of the shoulders. If it were not for this construction, it might be difficult to rely on the starting of the piston unless the engine is vertically disposed or inclined to the vertical.

In Figs. 16, 17, and 18, a modified form of the engine embodying my invention is shown in which the single form of engine is illustrated, particularly in the form of a vibrator. In this form of the invention, the cylinder 300 has the piston 301 enclosed therein. The cylinder 300 in this vibratory form may be anchored, if desired by screws received by screw threads of the opening 302 to a member to which it may be attached, or the said device may be deposited in material to which vibratory motion is to be imparted. In this vibratory form, both ends of the cylinder may be provided with end plates 303 and 304, held in place by screws 305. Also, be it noted that one end of the cylinder 300 may be integrally formed as shown in Fig. 6. The cylinder 300 is provided in its center or middle portion with an inlet annular channel 306 for the admission of fluid pressure and also an exhaust annular channel 307. Annular channel 306 has preferably a plurality of radially disposed passageways 308 leading into a threaded recess 309, in which may be secured a fluid pressure conduit or hose. Exhaust annular channel 307 has a plurality of radially directed exhaust passageways 310. The piston 301 has lugs 311 and 312 on each end portion thereof of relatively wide width. Likewise, said piston has a middle lug 313, having a circumferentially disposed shallow starter groove 314, said middle lug being preferably of narrow width in contrast to the middle lug 16 of Fig. 1. Piston 301 also has on each side of the middle lug 313 relatively wide grooves 315 and 316. Groove 315 has a port 317 connected to longitudinally disposed passageway 318, leading into the end of the piston and opening to the adjacent end of the bore of the cylinder 301. Similarly, groove 316 has port 319 leading into longitudinal passageway 320, which leads to the opposite end of piston 301 and opening into the adjacent end portion of the bore of cylinder 300. The starter shallow groove 314 has a starter orifice or very small hole 321, having its own separate and independent passageway 322, leading to one end portion of the piston; for example, to the end portion of the bore of the cylinder 300 located at the left-hand end of the figure.

Since the construction of the device of Figs. 17 and 18 are identical, the same parts are given the same numbers as set forth in Fig. 16.

For the better understanding of the operation of the piston 301 in cooperation with the cylinder 300, the piston 301 is shown in Fig. 16 at the extreme right end portion of its stroke, leaving a space 323 in which the retained entrapped fluid medium may be compressed. In Fig. 17, the piston is shown at the left end of the bore of the cylinder 300. In Fig. 18, the piston is shown at dead center with the shallow starting groove 314 in register with the annular channel 308, at which time the piston has its lug 312 closing the exhaust annular channel 307 and their cooperating radially directed passageways 310.

The type of engine shown in Figs. 16, 17 and 18, having one exhaust passageway, has definite advantage where necessary moisture is to be kept out of the air of the room in which the device is working or in under water operation where it is necessary to lead off the exhaust by a hose to the outside atmosphere. Also in many tools, this construction and design of the tool is such as to limit the device to one exhaust passageway. The walls may be of such thinness as not to permit the location of the exhaust passageway in any other but one small segment of the cylinder as in a stepped housing or cylinder construction.

Having the exhaust ports at one end portion only of the cylinder, as in Figs. 16, 17 and 18, provides for certain advantages as above set forth. However, such construction reduces the speed in one direction and the power, thus resulting in an unbalanced vibration. In some types of work, such unbalanced operation is very advantageous.

In a modified form, Figs. 19, 20, and 21 are shown views in longitudinal section of the single form of engine of my invention designed to impart vibratory reciprocating motion to a member to which it may be attached or on which it may be mounted, having the exhaust at both ends of the bore of the cylinder. A cylinder 350 has a piston 351 reciprocally mounted therein. The cylinder 350 has end plates 352 and 353 as closure means for the end of the bore of the cylinder 350. In the walls of cylinder 350 there is an inlet annular channel 354; and in each end portion of said cylinder in spaced relation with the end plates 352 and 353 are exhaust annular channels 355 and 356. These respectively have radially directed passageways 357 and 358 leading through the cylinder walls. Piston 351 has relatively wide lugs 359 and 360 disposed on the end portions thereof. Said piston also has a middle or centrally located lug 361, having a shallow starter groove 362. Between lug 359 and the middle lug 361, there is the relatively wide groove 363; and between said middle lug 361 and the end lug 360, there is the relatively wide groove 364. A longitudinal passageway 365 with port 366 in groove 363 extends through the piston to the end thereof and opens into the end portion of the bore of the cylinder next to the end plate 353. A longitudinal passageway 367 having a port 368 extends through the piston longitudinally and opens into the end portion of the bore of the cylinder 350 adjacent the end plate 352. Inlet annular channel 354 in the cylinder wall has a plurality of inlet radially directed passageways 369, opening into a threaded recess 370, which is adapted to receive a conduit from a source of fluid pressure. Since the parts of the engine illustrated in Figs. 19, 20, and 21 are all the same, the same numbers are applied to the parts of these respective figures.

The construction shown in Figs. 19, 20 and 21 with exhaust ports at each end of the cylinder, provides for higher speed than is developed by the construction of Figs. 16, 17 and 18. Also the same provides for more powerful blows or violent vibration.

Relative Figs. 22, 23, 24, 25 and 26: The construction of these figures are similar to that shown in Figs. 1, 2, 3, 4 and 5 but the porting and the exhausting relatively are different. Cylinder 400 has piston 401. Cylinder 400 has transversely disposed exhaust channels 402 and 403 with longitudinal passageway 404 leading from channel 402 to the outside of the cylinder 400 at one end and with longitudinal passageway 405 leading from channel 403 to the outside of the cylinder 400 at the same end as passageway 404.

Inlet channel 406 of relatively wide width has radially disposed passage 407 (preferably a plurality in number) leading into inlet channel 408 located transversely and centrally of the cylinder 400.

Piston 401 has relatively wide lugs 409 and 410 located at opposite ends of the piston, and a middle lug 411 relatively narrow as compared to middle lug 16 of Fig. 1. Said middle lug 411 has shallow starter groove 412 with a very small hole or orifice 413 leading into longitudinal passageway 417 through which orifice 413 the fluid pressure may slowly pass or seep or leak in providing a fluid pressure in one end of the cylinder bore to move said piston off dead center. Piston 401 has relatively wide grooves 414 and 415. Said piston 401 also has longituidnal passages 416 and 417 leading respectively from port 418 in groove 414 to the remote end of the piston 401, and leading from port 419 in groove 415 to the remote end of the piston 401.

In Fig. 22 the piston 401 is positioned in the extreme end to the right showing the porting relation is such that both exhausts are open, one opening into the groove 414 and one into the end portion of the bore ahead of the piston 401.

In Fig. 23, the piston 401 is shown when its starting groove 412 is in register with the inlet channel 408, showing both the end lugs 409 and 410 closing both of the exhaust ports or channels 402 and 403.

In Fig. 26, the exhaust channels 420 and 421 with radial passageways to outside of the cylinder are located in the end portions of the cylinder 400 and lead directly to outside of the cylinder 400. The porting relation is such that the lugs 409 and 410 close exhaust channels 420 and 421 when the starting groove 412 is in register with the inlet channel 408.

The construction of Figs. 22, 23, 24, 25 and 26 are characterized by higher speeds than that shown in Figs. 1, 2, 3, 4 and 5. They are also more powerful, and employ a plurality of times less fluid pressure medium. Also such construction of said Figs. 22, 23, 24, 25 and 26 are particularly characterized by easier starting and no stalling. Said construction will also start and operate on much less magnitude of fluid pressure.

Relative Figs. 27, 28, 29, 30, 31 and 32: The construction shown in these figures is that set forth in my copending application serial number 97,664, now abandoned, wherein is shown a hollow housing 450 provided with an exteriorly threaded shoulder 451 on one end thereof. A supporting member 452 provided with a plurality of inclined exhaust openings 453 is threaded on the shoulder 451 for closing one end of the housing 450 and the member 452 is provided with a central hole 454 for receiving therein a tool shank 455. The other end of the housing 450 is provided with a plurality of spaced exhaust apertures 456, and this end of the housing 450 is cut away, as at 457. A valve 458 provided with a plurality of finger-engaging lugs 459 is rotatably supported on the cut-away portion 457 and the valve 458 is provided with a plurality of spaced aperture 460 which are adapted to move into and out of registry with the apertures 456 in the housing 450 whereby the pressure in the housing 450 can be controlled as desired.

A plate 461 is cut away to define a chamber 462 and this plate is secured to the end of housing 450 by means of a plurality of securing elements, such as countersunk screws 463. The plate 461 is threaded exteriorly, as at 464, and a handle 465 is threaded onto the plate 461. The handle 465 is provided with a conduit 466, Fig. 1, which extends therethrough for conveying compressed air or other fluid from a source of supply to the chamber 462. A valve 467 provided with a restricted orifice 468 is arranged in the handle 465 and the incoming air passes through this orifice. A suitable ball 469 is adapted to selectively prevent or permit the flow of air therethrough. The ball 469 is moved by an actuating member 470 which is pivoted to the handle by a pin 471, there being a wire or rod 472 connecting the actuating member 470 to the ball 469.

The air leaves the chamber 462 and passes through registering bores 473 and 474 in the housing 450 and plate 461, respectively, and the air is conveyed to a transverse annular recess 475 which is formed in the housing 450. Slidably arranged in the housing 450 is a cylinder 476 having one end closed and its other end open which is closed by a cap 477. There are a first set or plurality of spaced exhaust channelways 478 arranged in the wall of the cylinder 476 and the channelways register with holes in the cap 477 for a purpose to be later described. A second set or plurality of spaced exhaust open-ended channelways 480 extend from the opposite end of the cylinder 476. The cylinder 476 is provided with a transverse annular groove 481 intermediate its ends, and a plurality of ports 482 extend radially inward from the groove 481 whereby air will pass from the recess 475 into the groove 481 and then through the ports 482 into the cylinder 476.

Slidably or reciprocably arranged in the cylinder 476 is a piston 483 which has a construction as described in detail in my copending application, Serial No. 97,661, filed June 7, 1949, now abandoned. The piston is provided with a pair of spaced transverse grooves 484 and 485. A first open-ended passageway 486 extends from the groove 484 to one end of the piston, and a second passageway 487 extends from the other groove 485 to the opposite end of the piston. An aperture 488 communicates with the passageway so that the piston can be started from its dead center position.

In operation, air is conveyed from a suitable source of supply through the conduit 466 in the handle 465, the amount of air passing therethrough being controlled by the manually operable actuating member 470. The incoming air then enters the chamber 462 and passes through the registering bores 473 and 474, then through the ports 482 and into the cylinder 476. Thus, with the piston 483 and cylinder 476 in the position shown in Figure 27, the incoming air will pass through the passageway 487 and will be emitted from the left side of the piston to thereby move the piston 483 to the right. At the same time, air within the cylinder 476 will exhaust through the passageways 486 and out through the channelways 478. This air which is exhausting from the channelways 478 is ejected against the plate 461 so that the cylinder 476 will move to the left to the position shown in Fig. 28. The rotary valve 458 is rotated as desired to control the amount of air exhausting through the apertures 456 to thereby control the back pressure in housing 450. It will be thus readily understood that rotary valve 458 is positioned manually and as such constitutes an "operationally controlled" manual valve means for selectively controlling the rate of fluid medium exhaust from the cylindrical body while the engine is in operation. Thus, at this time, the cylinder 476 is at its extreme left position in contact with the tool shank 455 and the piston 483 is at the extreme right position, Fig. 28. Now, the incoming compressed air will first pass through the passageway 486 to begin to move the piston to the left. At the same time, air from within the cylinder 476 is now exhausting through the passageways 487 out through the channelways 480 in the housing 450, and finally out through the apertures 453 in the supporting member 452. This cycle is, of course, continuous so that the piston and cylinder both oscillate back and forth whereby the cylinder 476 will be moved into and out of contact with the tool shank 455 so that the tool (not shown) will deliver a series of continuing blows.

From the foregoing, it is apparent that a pneumatic hammer has been provided which compounds the power and eliminates much of the discomforting shock that such tool operators usually experience. A wide range of speed is possible and the power delivered and speed can be controlled either by the actuating member 470 or the rotary valve 458.

By way of summary, my invention involves many outstanding important advantages over pneumatic engines of common practice design. In the above, I have set forth several exemplary forms out of the great many that are possible of the engine of my invention.

I have discovered that in using pneumatic fluid pressure in tools, each material on which work is to be done requires for optimum performance a tool having certain porting relationships, that is, the relation of the inlet and exhaust ports of the cylinder with respect to the width of lugs, hills or lands of the piston and the number and size of the piston ducts or passageways, and the length of the bore with respect to travel distance of the piston. I have discovered that each tool must provide for a particular rate and type of vibration (balanced or unbalanced, short or long stroke) for optimum results for working on a given material. These various modified forms of the engine of my invention illustrated provide different vibration rates and illustrations as to how different rates of vibration may be brought about, for example by varying the number of exhaust outlets and also by varying number of ducts in the piston, i. e. having more in one end than in the other, and also by placing the inlet opening nearer one end of the cylinder than the other. These may be used separately or in combination to secure varied modes of vibration. For these reasons, the importance of the porting relationship (spacing of exhaust ports from the inlet port and lugs of piston) has been emphasized as the same is critical and establishes new functional relationships between the elements of the mechanism which account for its remarkable effectiveness and efficiency. By reason of these new functional relationships, engines according to my invention are readily adaptable as the modified forms indicate, to complex requirements of different industries and thereby overcome unsolved problems long confronting such industries.

The maintenance of keenness of cutting edge of cutting tools employed with the engine of my invention is believed to be brought about by the shortness of stroke and simultaneously high frequency or velocity of reciprocation. Whatever may be the theoretical explanation, the fact is that such cutting tools operated by my engine retain their keenness of edge a plurality of times longer than where engines or motors of common practice design are substituted.

The reason for employment by my engines of fluid pressure most economically i. e. employ a much less volume of fluid pressure medium to perform a given work is at least in part due to the high velocity of reciprocation and shortness of stroke. Also a contributory factor for such efficiency of use of the fluid medium under pressure is the fact that in the engine herein disclosed, the piston never reaches the ends of the cylinder for in the vibrating form of said engine, the piston always entrapping some portion of the exhausting fluid medium. Thus live fluid pressure medium is not required to fill such portion of the cylinder in which the entrapped medium is located and yet there is a resilient medium present to act as a cushion and to cause the piston to start on its reverse stroke. Thus the exhausting fluid pressure medium is made to function in two capacities first as live fluid medium and than as entrapped medium in end of cylinder. When the engine is used as a pneumatic hammer, then the fluid pressure medium is entrapped in one end only, as the piston hits the tool shank in metal to metal contact and, of course, no cushioning is involved.

I claim:

1. A fluid operated engine, comprising a cylinder having a longitudinally extending bore closed at its ends, said cylinder having an annular, transversely extending fluid inlet channel disposed interiorly of and intermediate the ends of said bore, and two longitudinally spaced, annular, transversely extending exhaust channels, one on each side of the inlet channel and communicating in exhausting to the atmosphere; and a piston reciprocally mounted in said bore, which piston has a circumferential groove of a width wider than an end lug respectively in each end portion thereof alternately in communication with said inlet channel in the reciprocating movement of said piston, and oppositely directed longitudinal inlet-exhaust passages in said piston each having a bore end opening and an inner end opening disposed in that groove remote from said bore end.

2. In a fluid operated engine, a cylinder having an annular, transversely extending fluid inlet channel disposed interiorly of and intermediate the ends of said bore and having two longitudinally spaced, annular, transversely extending exhaust channels, one on each side of said inlet channel; and a piston reciprocally mounted in said bore which piston has a circumferential groove in each end portion thereof, oppositely directed longitudinal inlet-exhaust passages in said piston, each having a bore end opening and an inner end opening disposed in that groove remote from said bore end, a middle lug disposed transversely of the central portion of said piston between said circumferential grooves in the end portions thereof and a narrow circumferential groove in said middle lug and a radial passage leading from the narrow groove into only one of said passages and providing a starting orifice, each ledge of said middle lug exclusive of said narrow groove being of a longitudinal dimension at least substantially coextensive with the dimension of said fluid inlet port.

3. In a fluid operated engine in combination a cylinder having a longitudinally extending bore closed at its ends, said cylinder having a fluid inlet port disposed intermediate the ends of said bore and opening into an inlet annular groove in the wall of the cylinder, and two longitudinally spaced exhaust ports one on each side of the inlet port each opening into an exhaust annular groove in the wall of the cylinder and communicating in exhausting to the outside of the cylinder; and a piston reciprocally mounted in said bore which piston has lugs disposed on each end portion thereof, an inlet-exhaust circumferential groove in each end portion thereof of a width greater than an end lug alternately in communication with said inlet port in the reciprocating movement of said piston, and oppositely directed longitudinal inlet-exhaust passages each having a bore end opening and an inner end opening disposed in that groove remote from said bore end, said inlet annular groove providing equal pressure about the piston in floatingly mounting the same.

4. In a fluid operated engine, a cylinder having an annular, transversely extending compressed fluid inlet means interiorly disposed centrally between the ends of said bore, two longitudinally spaced exhaust ports one on each side of said fluid inlet means, each opening into an annular exhaust groove in the wall of said cylinder; and a piston reciprocally mounted in said bore which piston has an inlet-exhaust circumferential groove in each end portion thereof, oppositely directed longitudinal passages each having a bore end opening and an inner end opening disposed in that groove remote from said bore end, and a narrow circumferential groove between said pair of grooves formed of shoulders the width of each of which is slightly greater than the width of the inlet means and a relatively very small aperture connecting said narrow groove with one of said passages, said narrow groove being in communication with the inlet means whenever the piston concludes a previous operation and stops on dead center.

5. A fluid operated engine comprising a cylinder having a longitudinally extending bore closed at its ends, said cylinder having an annular, transversely extending compressed fluid inlet means, interiorly disposed centrally of the ends of said bore, and two longitudinally spaced annular, transversely extending exhaust means, one on each side of the inlet means; a piston reciprocally mounted in said bore which piston has a circumferential groove of relatively wide width in each end portion thereof providing for continued exhaust for an extended portion of the travel of the piston and alternately in communication with said inlet means in the reciprocating movement of said piston, oppositely directed longitudinal passages each having a bore end opening and an inner end opening disposed in that groove remote from said bore end; and a narrow circumferential groove between said pair of grooves formed of shoulders the width of each of which is slightly greater than the width of the inlet means, and a relatively very small aperture connecting said narrow groove with one of said passages, said narrow groove being in communication with the inlet means when the piston stops at a middle position in the cylinder.

6. In an engine of the character described having a centrally disposed fluid medium inlet port, the combination of a piston with a middle lug which has a starting groove, each ledge portion of said middle lug exclusive of said starting groove being of a longitudinal dimension at least substantially equal to the dimension of said fluid medium inlet port, and a radially directed passageway leading from said groove and connecting with a longitudinal passageway within said piston communicating with the end of said piston.

7. A fluid operated engine comprising a cylinder having a longitudinally extended bore closed at its ends, said cylinder having a transversely extending annular inlet pressure fluid medium channel means disposed centrally of the ends of said bore and two longitudinally spaced transversely extending annular exhaust channels, one on each side of the inlet means communicating with ports exhausting the fluid medium to the outside of the cylinder; and a piston reciprocally mounted in said bore, which piston has relatively wide lugs at the end portions thereof which are spaced with definite reference to the space between said exhaust ports, in providing for controlling passage therethrough of fluid medium; and a circumferential middle lug disposed transversely of the central portion of said piston, relatively wide circumferential grooves disposed between each of said end lugs and the middle lug, said grooves being alternately in communication with said inlet port during the reciprocation of said piston, and oppositely directed longitudinal passages within the piston, each having a bore end opening and an inner end opening in that groove remote from said bore end; and an inlet fluid pressure controlling means for the engine, the length of the piston, the width of the relatively wide grooves, the width of the relatively wide middle lug, and the width of the end lugs of the piston, being proportioned with respect to the distance between the exhaust ports to leave both exhaust ports open within said relatively wide grooves when the piston has its longitudinal center in register with the inlet means, the exhausting of the pressure medium from that end of the bore towards which the piston moves being prolonged throughout the piston travel to the extent of the width of the wide groove.

8. An engine of the class described comprising a housing; a cylinder reciprocably mounted in said housing for delivering working blows to matter on which work is to be done; and a piston reciprocably mounted within and driving said cylinder and imparting its force to said cylinder through fluid medium therebetween in providing said working blows.

9. An engine of the class described comprising a housing having a front and rear end, said rear end being closed; a manually controlled inlet fluid pressure valve means disposed in the housing in the end portion of said closed end; a retaining ring mounted on the end portion of said front end of said housing; a cylinder reciprocably mounted within said housing, said cylinder having an annular inlet pressure fluid medium transversely disposed channel located intermediate the ends of said bore and two annular longitudinally spaced exhaust channels in the end portions thereof, one on each side of said inlet channel for exhausting to the outside of the cylinder through ports communicating therewith; a piston reciprocally mounted within and driving said cylinder through fluid medium therebetween, which piston has annular lugs at the end portions thereof, the location of each of which is determined by the space between said exhaust ports in providing for controlling passage therethrough of fluid medium, and said end lugs being at least wider than said exhaust channel ports, an annular middle lug disposed transversely of the central portion of said piston, circumferential grooves wider than said end piston lug disposed and extending between each of said end lugs and the middle lug, said grooves being alternately in communication with said inlet channel in the reciprocating of said piston, and oppositely directed longitudinal passages within the piston, each having a bore end opening and an inner end opening in that groove remote from said bore end.

10. In a pneumatic hammer, a hollow cylindrical body, a closure for each end of the body, one of the closures having an axial opening for the reception of the shank of a tool, a hollow cylinder slidable within the body and having a solid closed end adjacent to said axial opening, a closure for the other end of the cylinder, a free moving power piston reciprocable within and driving said cylinder through fluid medium thereby, valve means for selectively admitting compressed air to the cylinder from a source of supply, said compressed air imparting reciprocating motion directly to the piston in advance of movement of the cylinder thereby, said piston in reciprocating and driving said cylinder in a manner imparting a like secondary motion to said cylinder driving the said solid closed end of the latter against the said tool shank on the working strokes of both the cylinder and piston, and means for exhausting the expended air alternately from opposite ends of the piston to atmosphere.

11. The invention according to claim 10, wherein the last named means includes the interior of the cylindrical body at the end remote from said axial opening, and manually controlled valve means for controlling passage of the expended air from the said end of the cylindrical body.

12. The invention according to claim 17, wherein the means for exhausting the expended air alternately from opposite sides of the piston includes a passageway extending from one side of the longitudinal center of said cylinder to the interior of the cylindrical body at the end thereof remote from said axial opening and a second passageway from the other side of the longitudinal center of said cylinder also in communication with the interior of the cylindrical body at the said end thereof remote from said axial opening.

13. The invention according to claim 10, wherein the last named means includes the interior of the cylindrical body at the end remote from said axial opening, the said end of the cylindrical body having an exhaust opening in the wall thereof, an annular valve band encircling the said end of the cylinder body and having an opening therethrough, said valve band being rotatable for effecting selectively variable registry of the opening therein with said exhaust opening, and means carried by said band for facilitating rotation thereof.

14. In a pneumatic hammer, a hollow cylindrical body, a closure for each end of the body, one of the closures having an axial opening for the reception of the shank of a tool, a hollow cylinder slidable within the body and having a solid closed end adjacent to said axial opening, a closure for the other end of the cylinder, a first air exhaust passage in and extending longitudinally of the wall of the cylinder and opening at one end thereinto upon one side of the longitudinal center of the cylinder and opening at its other end into the end of the cylindrical body remote from the said one end of the passage, a second air exhaust passage in and extending longitudinally of the wall of the cylinder and opening at one end thereinto upon the side of the longitudinal center of the cylinder remote from the said side opening of the first air exhaust passage and opening at its other end into the end of the cylindrical body opposite from the end thereof into which said first passage opens, a free moving power piston slidable within the cylinder, an annular air receiving recess in the inner wall of the body approximately midway of its ends, an annular air receiving recess in the outer wall of the cylinder in approximately the said longitudinal center thereof, said last recess being in constant communication in all positions of the cylinder with the annular air receiving recess of the cylindrical body, said cylindrical body having a port leading from the annular recess therein to the interior of the cylinder, piston means for admitting compressed air through said port alternately to opposite ends of the cylinder and alternately opening and closing said first and second air exhaust passages in timed relation with the admission of air to the opposite ends of the cylinder to effect the reciprocation of the piston in the cylinder in advance of movement of the cylinder, manually controlled valve means for admitting compressed air to the first stated annular recess from a source of supply, said piston in reciprocating imparting a like secondary motion to the cylinder to drive the said solid closed end of the latter against the said tool shank on the working strokes of both the cylinder and piston, means for discharging expended air to the atmosphere from the end of the cylinder body having the said axial opening, and means for discharging expended air to the atmosphere from the opposite end of the cylinder body.

15. The invention according to claim 14, with valve means for reducing the discharge of expended air by said last means whereby a retarding air cushion is set up in the cylinder body opposing the idling stroke of the cylinder and piston.

16. A fluid operated engine comprising a cylinder having a longitudinally extended bore closed at its ends, said cylinder having a pressure fluid medium inlet in the form of an annular channel disposed transversely and interiorly of the bore face of said cylinder and located intermediate the ends of said bore, and two longitudinally spaced annular exhaust channels disposed interiorly of the bore face of said cylinder with exhaust ports communicating with the outside of the cylinder, one of said channels being disposed on each side of said inlet channel; a piston reciprocably mounted in said bore which piston has annular lugs at the end portions thereof, the location of each of which is determined by the space between said exhaust channels in providing for controlling passage therethrough of fluid medium, said end lugs being at least wider than said exhaust channels; an annular middle lug disposed transversely of the central portion of the said piston; relatively wide circumferential grooves extending between each of said end lugs and the middle lug, said grooves being alternately in communication with said inlet channel in the reciprocating of said piston, said grooves being dimensioned with respect to said exhaust channels in communicating one or the other of said grooves with its exhaust channel for at least a major portion of the stroke of said piston; and oppositely directed longitudinal passages within the piston each having a bore end opening and an inner end opening in that groove remote from said bore end.

17. The combination according to claim 16, wherein said annular middle lug is centrally provided with a narrow, transversely extending circumferential starting groove in communication with only one end of said piston, the portions of said annular middle lug exclusive of said starting groove each being of a dimension at least substantially equalling the diameter of said fluid medium annular channel inlet.

18. The invention according to claim 17, wherein the piston has a narrow circumferential groove in the face portion and a radial passage leading from the narrow groove into one of said longitudinal passageways of said piston, said narrow groove being in communication with the inlet channel when the piston stops at a middle position in the cylinder.

19. The combination of claim 17, wherein said middle lug has a starter groove which has an orifice which has a separate and independent passageway within said piston extending to the end of said piston.

References Cited in the file of this patent

UNITED STATES PATENTS

| | | |
|---|---|---|
| 542,498 | Rinsche | July 9, 1895 |
| 592,115 | Johnson | Oct. 19, 1897 |
| 592,116 | Johnson | Oct. 19, 1897 |
| 670,646 | Soley | Mar. 26, 1901 |
| 926,260 | Klein | June 29, 1909 |
| 1,174,869 | Joecken | Mar. 7, 1916 |
| 1,940,388 | Callahan | Dec. 19, 1933 |

FOREIGN PATENTS

| | | |
|---|---|---|
| 487,154 | Great Britain | June 13, 1938 |